(12) United States Patent
Nattkemper et al.

(10) Patent No.: US 7,454,012 B2
(45) Date of Patent: *Nov. 18, 2008

(54) MANAGING POWER IN A LINE POWERED NETWORK ELEMENT

(75) Inventors: Dieter H. Nattkemper, Raleigh, NC (US); Melvin Richard Phillips, Raleigh, NC (US); Kenneth L. Walker, III, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/134,323

(22) Filed: Apr. 29, 2002

(65) Prior Publication Data

US 2003/0202655 A1 Oct. 30, 2003

(51) Int. Cl.
*H04M 1/02* (2006.01)

(52) U.S. Cl. .................. 379/413; 307/116; 307/44; 361/764

(58) Field of Classification Search ............... 379/413, 379/395.01; 307/11–42, 85, 44, 116; 323/304, 323/318; 713/300–340; 361/764
See application file for complete search history.

(56) References Cited

U.S. PATENT DOCUMENTS

| | | | |
|---|---|---|---|
| 5,283,905 A * | 2/1994 | Saadeh et al. ............. 307/66 |
| 5,436,510 A * | 7/1995 | Gilbert .................... 307/38 |
| 5,600,228 A * | 2/1997 | Matsubayashi et al. ..... 320/155 |
| 5,627,833 A | 5/1997 | Bliven |
| 5,630,168 A * | 5/1997 | Rosebrugh et al. ........... 710/5 |
| 5,666,538 A | 9/1997 | DeNicola |
| 5,694,398 A | 12/1997 | Doll et al. |
| 5,761,429 A * | 6/1998 | Thompson ............... 709/224 |
| 5,774,689 A * | 6/1998 | Curtis et al. .............. 395/500 |
| 5,777,769 A | 7/1998 | Coutinho |
| 5,818,125 A | 10/1998 | Manchester |
| 5,825,674 A * | 10/1998 | Jackson ................... 713/321 |
| 5,924,015 A * | 7/1999 | Garrison et al. .......... 455/13.4 |
| 5,926,544 A | 7/1999 | Zhou |
| 5,990,575 A * | 11/1999 | Flaugher .................. 307/203 |
| 6,167,330 A * | 12/2000 | Linderman ................ 700/295 |
| 6,176,710 B1 | 1/2001 | Ewing et al. |

(Continued)

FOREIGN PATENT DOCUMENTS

WO    WO 00/41496    7/2000

(Continued)

OTHER PUBLICATIONS

Navini Networks, "Navini Networks™ Selects Objectivity to Power Management System for Ripwave™ Nomadic Wireless Broadband Technology," Jul. 23, 2001, Published in: US, p. 1.

*Primary Examiner*—Gerald Gauthier
(74) *Attorney, Agent, or Firm*—Fogg & Powers LLC (57) ABSTRACT

A system for managing power from a power source for at least one line powered network element in an access network is provided. The system includes a power manager that establishes at least one power criterion for the at least one network element. Further, the system includes a power controller that is responsive to the power manager. The power controller and the power manager communicate to manage operation of the at least one network element based on the at least one power criterion.

58 Claims, 6 Drawing Sheets

U.S. PATENT DOCUMENTS

| | | | |
|---|---|---|---|
| 6,366,657 B1 * | 4/2002 | Yagel et al. | 379/201.03 |
| 6,396,849 B1 | 5/2002 | Sarkissian et al. | |
| 6,496,515 B2 | 12/2002 | Lefebvre et al. | |
| 6,546,089 B1 * | 4/2003 | Chea, Jr. et al. | 379/379 |
| 6,587,953 B1 * | 7/2003 | Torikai | 713/330 |
| 6,606,383 B1 | 8/2003 | Robinson et al. | |
| 6,926,544 B2 | 8/2005 | Lee | |
| 6,947,554 B2 | 9/2005 | Freyman et al. | |
| 6,978,014 B1 | 12/2005 | Bentley | |
| 7,099,934 B1 * | 8/2006 | Ewing et al. | 709/223 |
| 2002/0002593 A1 * | 1/2002 | Ewing et al. | 709/310 |
| 2002/0044525 A1 | 4/2002 | Czerwiec et al. | |
| 2002/0117899 A1 | 8/2002 | Seefried et al. | |
| 2003/0003941 A1 | 1/2003 | Goto et al. | |
| 2003/0014677 A1 | 1/2003 | Howard et al. | |
| 2003/0126195 A1 * | 7/2003 | Reynolds et al. | 709/203 |
| 2003/0154276 A1 | 8/2003 | Caveny | |
| 2003/0185385 A1 | 10/2003 | Boudreaux, Jr. et al. | |
| 2004/0196134 A1 | 10/2004 | Milanczak | |
| 2005/0163152 A1 | 7/2005 | Binder | |
| 2006/0136625 A1 * | 6/2006 | Kao et al. | 710/67 |

FOREIGN PATENT DOCUMENTS

| | | |
|---|---|---|
| WO | WO 01/58123 | 8/2001 |

* cited by examiner

MANAGING POWER IN A LINE POWERED NETWORK ELEMENT

TECHNICAL FIELD

This invention relates to the field of telecommunications, and, in particular, to managing power in a line powered network element.

BACKGROUND

Telecommunications networks transport signals between user equipment at diverse locations. A telecommunications network includes a number of components. For example, a telecommunications network typically includes a number of switching elements that provide selective routing of signals between network elements. Additionally, telecommunications networks include communication media, e.g., twisted pair, fiber optic cable, coaxial cable or the like that transport the signals between switches. Further, some telecommunications networks include access networks.

For purposes of this specification, the term access network means a portion of a telecommunication network, e.g., the public switched telephone network (PSTN), that allows subscriber equipment or devices to connect to a core network. For example, an access network is the cable plant and equipment normally located in a central office or outside plant cabinets that directly provides service interface to subscribers in a service area. The access network provides the interface between the subscriber service end points and the communication network that provides the given service. An access network typically includes a number of network elements. A network element is a facility or the equipment in the access network that provides the service interfaces for the provisioned telecommunication services. A network element may be a stand-alone device or may be distributed among a number of devices.

There are a number of conventional forms for access networks. For example, the digital loop carrier is an early form of access network. The conventional digital loop carrier transported signals to and from subscriber equipment using two network elements. At the core network side, a central office terminal is provided. The central office terminal is connected to the remote terminal over a high-speed digital link, e.g., a number of T1 lines or other appropriate high-speed digital transport medium. The remote terminal of the digital loop carrier typically connects to the subscriber over a conventional twisted pair drop.

The remote terminal of a digital loop carrier is often deployed deep in the customer service area. The remote terminal typically has line cards and other electronic circuits that need power to operate properly. In some applications, the remote terminal is powered locally. Unfortunately, to prevent failure of the remote terminal due to loss of local power, a local battery plant is typically used. This adds to the cost and complicates the maintainability of the remote terminal, due to the outside plant operational requirements which stipulate operation over extended temperature ranges.

In some networks, the remote terminal is fed power over a line from the central office. This is referred to as line feeding or line powering and can be accomplished through use of an AC or a DC source. Thus, if local power fails, the remote terminal still functions because it is typically powered over the line using a battery-backed power source. This allows the remote terminal to offer critical functions like lifeline plain old-fashioned telephone service (POTS) even during a power outage.

Over time, the variety of services offered over telecommunications networks has changed. Originally, the telecommunications networks were designed to carry narrowband, voice traffic. More recently, the networks have been modified to offer broadband services. These broadband services include services such as digital subscriber line (DSL) services. As time goes on, other broadband services will also be supported. These new services often come with increased power requirements.

As the service offerings have changed, the manner in which remote terminals are powered has not changed. The various services now offered are not all on equal footing. Data service today, unlike lifeline POTS, typically is not considered a necessity. Further, even among the other broadband services, there is a spectrum of variables affecting the level of service that a given subscriber wants and what the subscriber is willing to pay for it. Despite these changes in service offerings, the way that power is provided to the access equipment has not changed to keep pace with the service advancements.

Therefore, there is a need in the art for improvements in the manner in which power is provided to network elements in an access network.

SUMMARY

Embodiments of the present invention address problems with providing power to network elements in an access network. Particularly, embodiments of the present invention provide power management for line powered network elements. Power management is accomplished by a power manager that provisions a power controller associated with the network element with at least one power criterion to use in controlling the operation of the network element based on a monitored power condition. When power is lost or degraded, the power controller takes appropriate action such as reducing power consumption, turning off services and assuring compliance with terms of a service level agreement for a specific service provisioned on the network element.

In particular, one embodiment of the present invention provides a system for managing power from a power source for at least one line powered network element in an access network. The system includes a power manager that establishes at least one power criterion for the at least one network element. Further, the system includes a power controller that is responsive to the power manager. The power controller and the power manager communicate to manage operation of the at least one network element based on the at least one power criterion.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide management of line powered network elements in an access network. A number of embodiments are described in detail below. As an overview, the various embodiments manage the operation of the line powered network elements based on selectable power criteria, e.g., available power, power head room, priority of services, or terms of service level agreements for various subscribers. In general, a power manager establishes the power criteria for the managed network element and the provisioned services on the managed network element. A power controller communicates with the power manager and uses the power criteria to control the operation of the network element based on monitored power conditions of the network element. For example, the operation of the network element is selectively adjusted when power is lost or degraded, e.g., components of the network element are placed in low power mode, functions are disabled, or ports or services are selectively turned off.

Power based management of network elements provides many advantages in the operation of an access network. First, managed power results in higher efficiencies which permits an overall power savings. This translated into cost savings. Further, high power efficiency permits longer reach for a network element into the customer service area. Service intervals can also be scheduled or deferred for extended periods when power headroom is designed into power managed access networks. Also, power management can assure that priority services remain operational during element faults and battery plant faults, e.g., through use of a controlled service shut down based on priority of service and timed events. Finally, power management at the network element allows flexibility in creating differentiated services. For example, a selected data service at a moderate priority level may be provisioned to operate for a selected period of time when a power failure causes a switch over to a battery back-up power source.

A number of embodiments are described in the various sections below. Section I provides an overview of management of line powered network elements in an access network. Section II describes a number of specific embodiments that illustrate various options related to location of the power source, location of the power controller, and the type of access network being managed. Finally, Section III describes an embodiment that provides global management of network elements in an access network. In this embodiment, network elements from a variety of vendors are managed according to a consistent scheme through a variety of element management systems.

I. Overview

Figure 1:
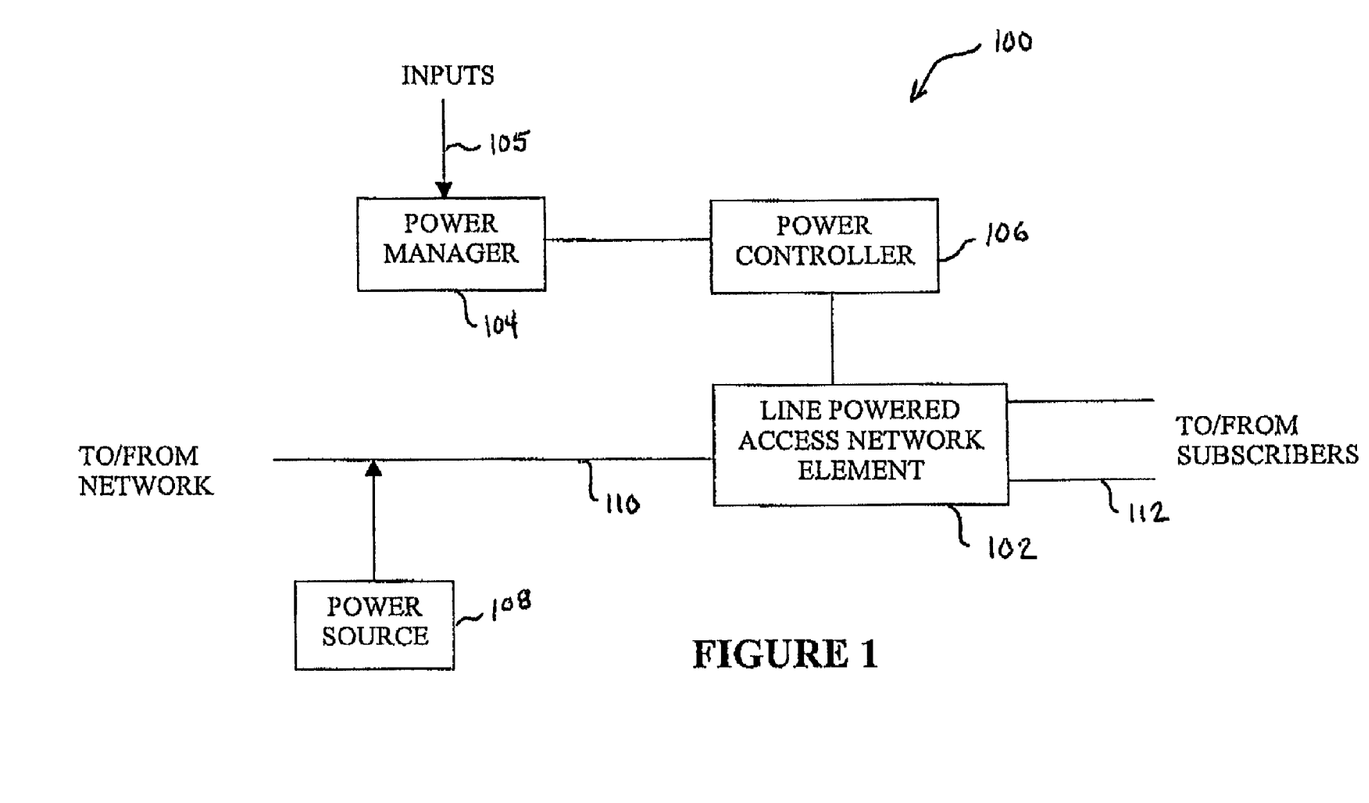
FIG. 1 is a block diagram of one embodiment of a system for managing power in a line powered network element.

FIG. 1 is a block diagram of one embodiment of a system, indicated generally at 100, for managing power in a line powered network element 102. Network element 102 is a network element disposed in an access network of a telecommunications network. The terms network element and access network are defined above. Network element 102 is typically located deep in the access network. In one embodiment, network element 102 comprises a copper fed remote terminal. In other embodiments, network element 102 comprises a fiber fed remote terminal such as in a fiber to the curb (FTTC), fiber to the node (FTTN) or a fiber to the home (FTTH) access network. Advantageously, the operation of network element 102 is managed based on at least one power criterion to respond to changes in power conditions at network element 102 to allow selected services to continue at some level even when power delivered to network element 102 is degraded. This ability to manage the operation of a network element based on power conditions allows service providers the ability to meet obligations in service level agreements (SLAs) in the face of reduced power.

Power manager 104 and power controller 106 manage network element 102. In one embodiment, power controller 106 is co-located with network element 102. In other embodiments, power controller 106 is not co-located with network element 102. Even when power controller 106 is not co-located with network element 102, power switching functions described below are accomplished at network element 102 based on input from power controller 106. This applies to each of the embodiments described below in which the power controller function is not co-located with the managed network element.

In one embodiment, power manager 104 provisions power controller 106 with the at least one power criterion to manage network element 102 based on inputs 105. In one embodiment, inputs 105 are provided to power manager 104 as a part of the flow through provisioning of a service to be provided by network element 102, e.g., a new DSL service provided to a subscriber over a port of network element 102. Advantageously, flow through provisioning of power criteria coupled to service provisioning creates predictable service that can provide service guarantees. In other embodiments, inputs 105 are provided to power manager 104, e.g., through a graphical user interface, to establish the power criteria for a provisioned service. In yet other embodiments, inputs 105 are received upstream from network element 102. In this case, inputs 105 are triggered from an event at network element 102 such as installation and announcement of the network element in the access network.

Power source 108 provides power to network element 102 over a power conductive medium 110. In one embodiment, medium 110 is also used to carry communication signals to network element 102. In one embodiment, conductive medium 110 comprises a single communication link. In other embodiments, conductive medium 110 comprises a plurality of communications links. Advantageously, using multiple lines to deliver power to a power managed network element provides a robust power transport interface with high availability. For example, the use of multiple lines allows a system to be designed with sufficient power head-room to maintain service despite loss of power over any given line.

Network element 102 provides communication services to a number of subscribers over subscriber drops 112. For example, in one embodiment, network element 102 provides plain old-fashioned telephone service (POTS), digital subscriber line (DSL) service, or other appropriate communication services to subscribers over subscriber drops 112.

In operation, power manager 104 manages the operation of network element 102 based at least in part on power criteria of a power control hierarchy. Power manager provides power criteria to power controller 106 to manage the operation of network element 102. When a line power source fails or degrades, power controller 106 executes one of a number of power saving options. First, power controller can maintain all services if sufficient power headroom is built into the system. If not, power controller 106 can degrade service performance by implementing various provisioned power save functions for the provisioned services. For example, power controller 106 implements power-save functions that include but are not limited to: turning off (or reducing power consumption) for network side physical interfaces, customer side physical interfaces, fans, ringer supplies, limiting power in analog front end (AFE) devices, entering low power mode for processors, central processing units (CPUs) embedded functions (e.g., ATM switch, packet switch) and other digital devices. If power-save functions are not sufficient, power controller selectively turns off services beginning with the lowest priority services. For example, in one embodiment, POTS service is highest priority and other services are shut down first so that lifeline services can continue to run.

In another embodiment, power controller 106 is provisioned with power criteria according to service level agreements for services provided at network element 102. For example, a selected service may be provisioned to be left on for a selected duration after power failure causes switch over to a battery back-up at power source 108. Similarly, other service level commitments can be monitored and maintained through power controller 106 and appropriate power criteria.

II. Additional Embodiments

Figure 2:
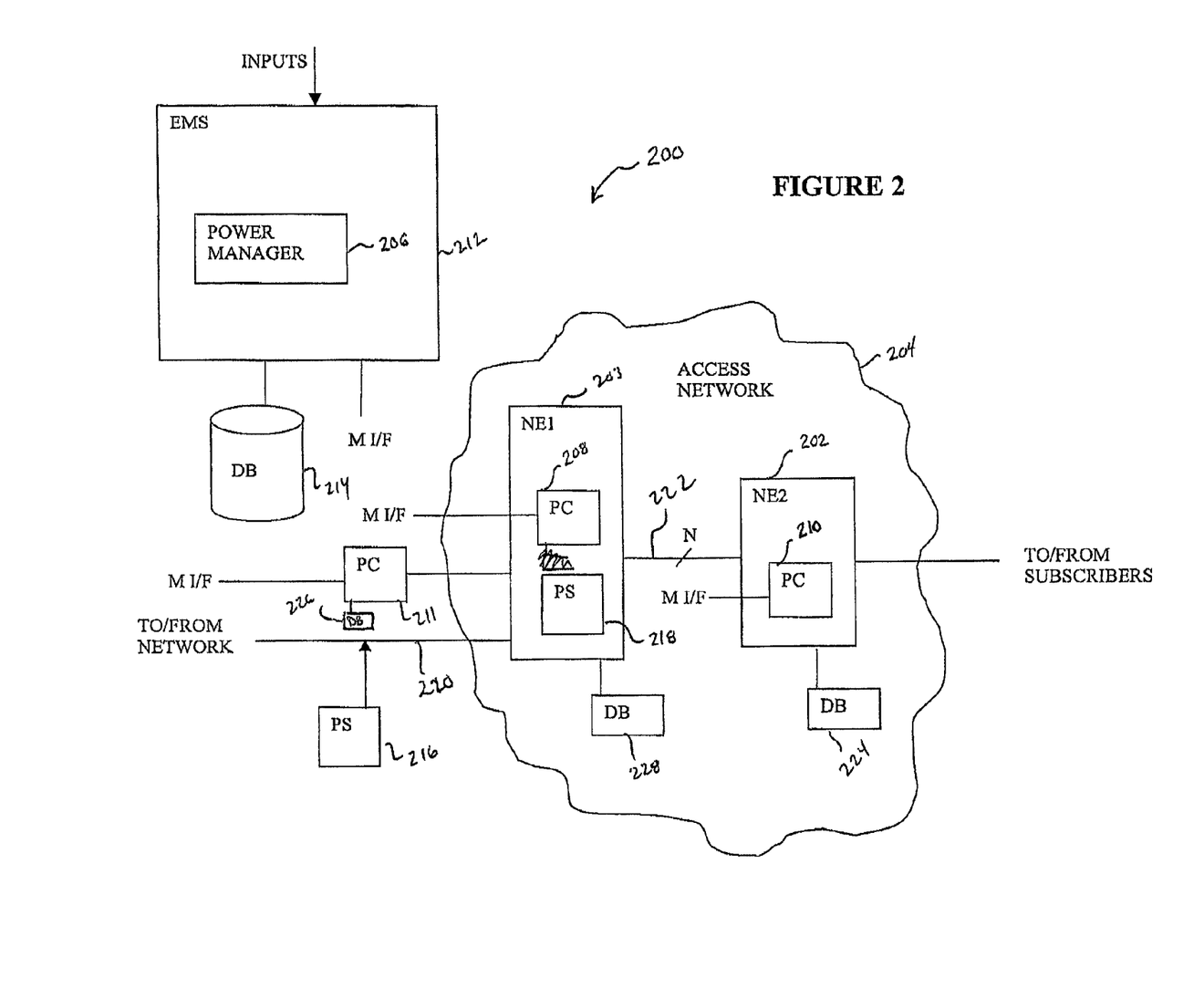
FIG. 2 is a block diagram of another embodiment of a system for managing power in a line powered network element in a star wired network.

FIGS. 2 through 5 illustrate a number of embodiments that apply the power management framework described above with respect to FIG. 1. In each of these embodiments, a number of power controllers and a number of power sources are illustrated. For example, FIG. 2 shows two power sources; one in the access network and one outside the access network. In a typical implementation, a power source is provided in either of the two identified locations although it is possible that multiple power sources are used. Further, FIG. 2 shows power controllers on each network element in the access network and one power controller outside the access network. In a typical implementation, the power controller is located either on one of the network elements, or in a number of modules distributed over a number of network elements or the power controller is located outside the access network. As noted above, however, even when the power controller is not located on the managed network element, power switching functions are accomplished on the network element under the control of the power controller.

Finally, FIGS. 2 through 5 illustrate use of power management for line powered network elements in a variety of access networks. It is understood that the claims of this application are not limited to the types of access networks shown, but, rather, are intended to cover any appropriate access network configuration presently known or later developed. Each of the Figures is described in turn below.

FIG. 2 is a block diagram of another embodiment of a system, indicated generally at 200, for managing power in a line powered network element 202 in access network 204. In this embodiment, power manager 206 manages network element 202 through one or more of power controllers (PCs) 208, 210 and 211 based on at least one power criterion. In this embodiment, access network 204 includes two network elements; network elements 202 and 203. Network element 202 comprises a line powered network element. In one embodiment, network element 202 is a remote terminal (RT) and network element 203 is a central office terminal (COT) in a digital subscriber line system. Network element 202 provides an interface to subscriber equipment, e.g., a DSL modem, and network element 203 provides an interface to a network, e.g., a data network such as the Internet.

In one embodiment, power manager 206 is an instantiation of a power management application running on a processor in an element management system (EMS) 212. The power management application includes machine-readable instructions stored on a machine-readable medium for running on the processor to implement a method for power manager 206. For purposes of this specification, an element management system is a system with functions that provide administration for one or more access networks and a plethora of network elements in the access network, e.g., a central office terminal, a remote terminal, etc. The functions of an EMS include provisioning, status performance monitoring, alarming for critical functions, report generation, statistics charting and many other functions. The man-machine interface for EMS 212 typically comprises a graphical user interface. In one embodiment, EMS 212 supports multiple instantiations of power manager 206. Each of the instantiations implements the same or different types of power management functions.

Power manager 206 establishes at least one power criterion for controlling services provided by network element 202. In one embodiment, database (DB) 214 is associated with EMS 212 and power manager 206. Database 214 stores data related to available power criteria for use in managing line powered network elements. Power manager 206 selects at least one power criterion from database 214 when a service is provisioned. In one embodiment, the selected at least one power criterion is associated with the service provided on network element 202 in database 214.

Power manager 206 communicates with one or more of power controllers 208, 210 and 211 over a management interface (M I/F). This management interface is accomplished with any known or later developed management interface, e.g., SNMP or other appropriate management interface.

In one embodiment, the power controller function resides solely with power controller 210 on network element 202. Thus, power controller 210 is provisioned directly by communication from power manager 206 over the management interface (M I/F). Provisioned information is stored in database 224 associated with power controller 210. Further, power controller 210 communicates status and alarm information directly to power manager 206 over the management interface (M I/F). Power controller 210 also controls the operation of network element 202 based on the provisioned at least one power criterion stored in database 224.

In other embodiments, either power controller 211 or 208 implements the power controller function with their associated databases 226 and 228, respectively. In yet further embodiments, the power controller function comprises modules spread across any two or more of power controllers 208, 210 and 211.

In one embodiment, power controllers 208, 210, and 211 are implemented as machine readable instructions stored on a machine readable medium and run on an embedded processor.

Power is provided to network element 202 from one or more of power sources (PSs) 216 and 218. For example, when power source 216 is used, power is injected onto a power conductive medium 220. The power is further passed on to network element 202 over power conductive medium 222. In one embodiment, power conductive medium 220 and power conductive medium 222 also carry communication traffic to and from access network 204. In one embodiment, power conductive medium 220 and power conductive medium 222 each comprise multiple communication lines. In other embodiments, the power is provided over a medium separate from the communication medium. In other embodiments, the power supply resides within access network 204, as represented by power supply 218.

In operation, power manager 206 manages the operation of network element 202 based on at least one power criterion. Power manager 206 selects and provides the at least one power criterion to one or more of power controllers 208, 210 and 211 based on data in data base 214 to manage operation of network element 202.

In one embodiment, power manager 206 establishes the at least one power criterion as part of a "flow through" provisioning for a service provided at network element 202. Power manager 206 establishes the at least one power criterion either through explicit or implicit selection. Implicit selection is accomplished by associating selected power criteria or a "power profile" with a type of service. Thus, when the service to be provisioned is selected, the power criteria or power profile associated with that service automatically flows through to the network element on which the service is provisioned. For example, POTS service is set up to inherit lifeline service characteristics from a default power profile. This power profile establishes, for example, that the POTS service has the highest priority and is thus the last service to be turned off when power is degraded or lost. When a POTS line is provisioned, power manager 206 passes parameters for this power profile to the appropriate power controller 208, 210, and/or 211. The power profile is stored in the associated database, e.g., databases 228, 224, and/or 226, respectively. Alternatively, explicit provisioning is accomplished by selectively associating a service with at least one power criterion or power profile, e.g., through a user interface of the EMS.

The provisioned power controller, e.g., power controller 208, monitors the operation of network element 202. If power fails or degrades, power controller 208 detects and reports the power condition and makes any necessary adjustments to the operation of network element 202 based on the current power conditions. For example, in one embodiment, power controller 208 shuts down services according to a priority scheme until the appropriate power consumption level is achieved. Any appropriate priority scheme can be used. For example, priority based on service type, port number, service level agreements, random, or other appropriate scheme. In other embodiments, power controller 208 places components in network element 202 in low power mode. The use of low power mode can also be implemented according to a priority scheme.

Figure 3:
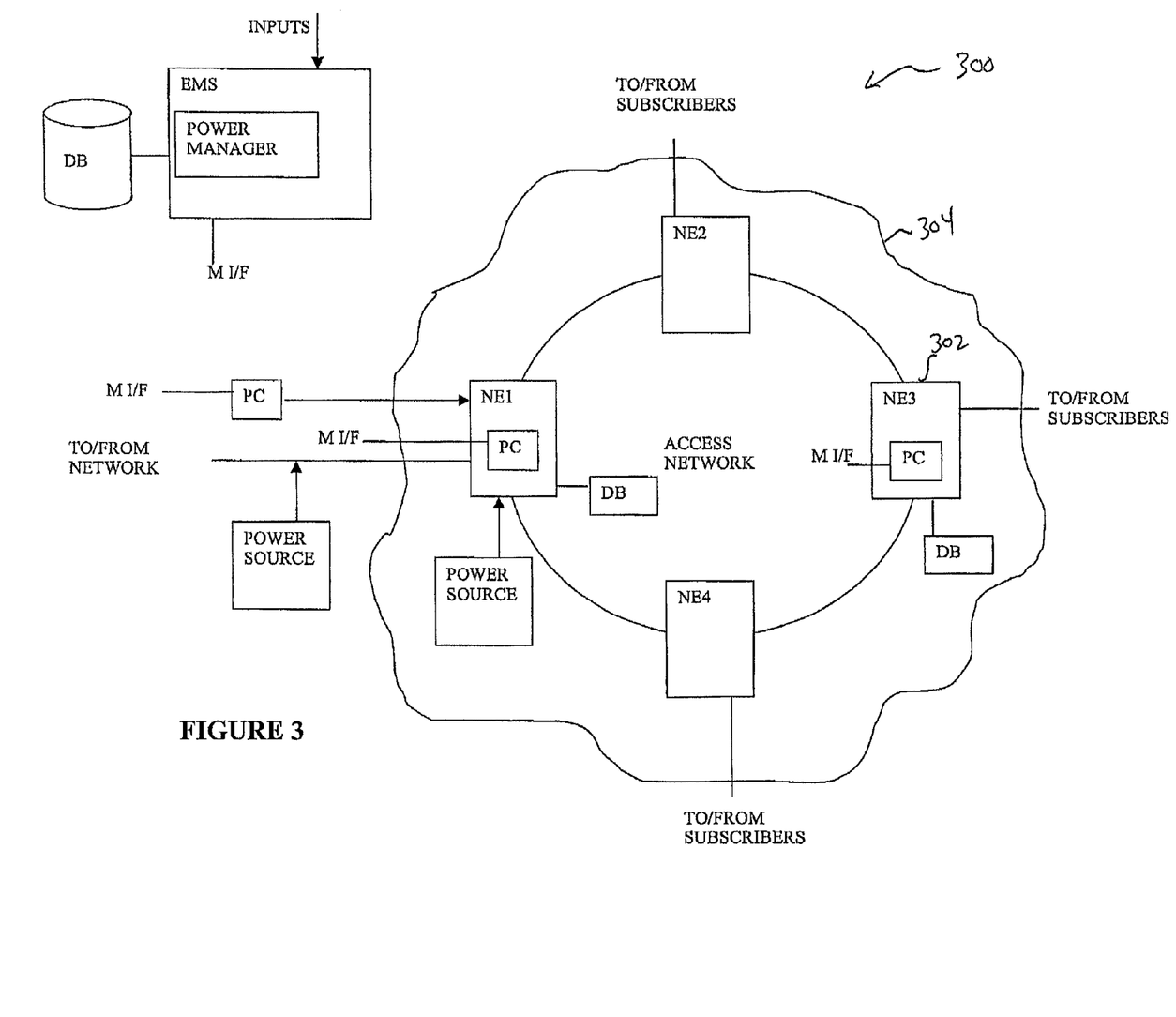
FIG. 3 is a block diagram of another embodiment of a system for managing power in a line powered network element of a ring network.

FIG. 3 is a block diagram of another embodiment of a system, indicated generally at 300, for managing power in a line powered network element 302 of a ring network 304. In one embodiment, ring network 304 comprises a synchronous optical network (SONET) or synchronous digital hierarchy (SDH) ring. In other embodiments, ring network 304 comprises any other appropriate ring network. Network element 302 is managed in a manner similar to that described above with respect to management of network element 202 of FIG. 2. In one embodiment, network elements NE2 and NE4 are also line powered and are manageable in a manner similar to that of network element 302. Further, line powering to the network elements, in one embodiment, is provided over a power delivery medium that is different from the communication medium. For example, signals are communicated around the ring of access network 304 using fiber optic cable whereas power is distributed over a copper-based medium.

Figure 4:
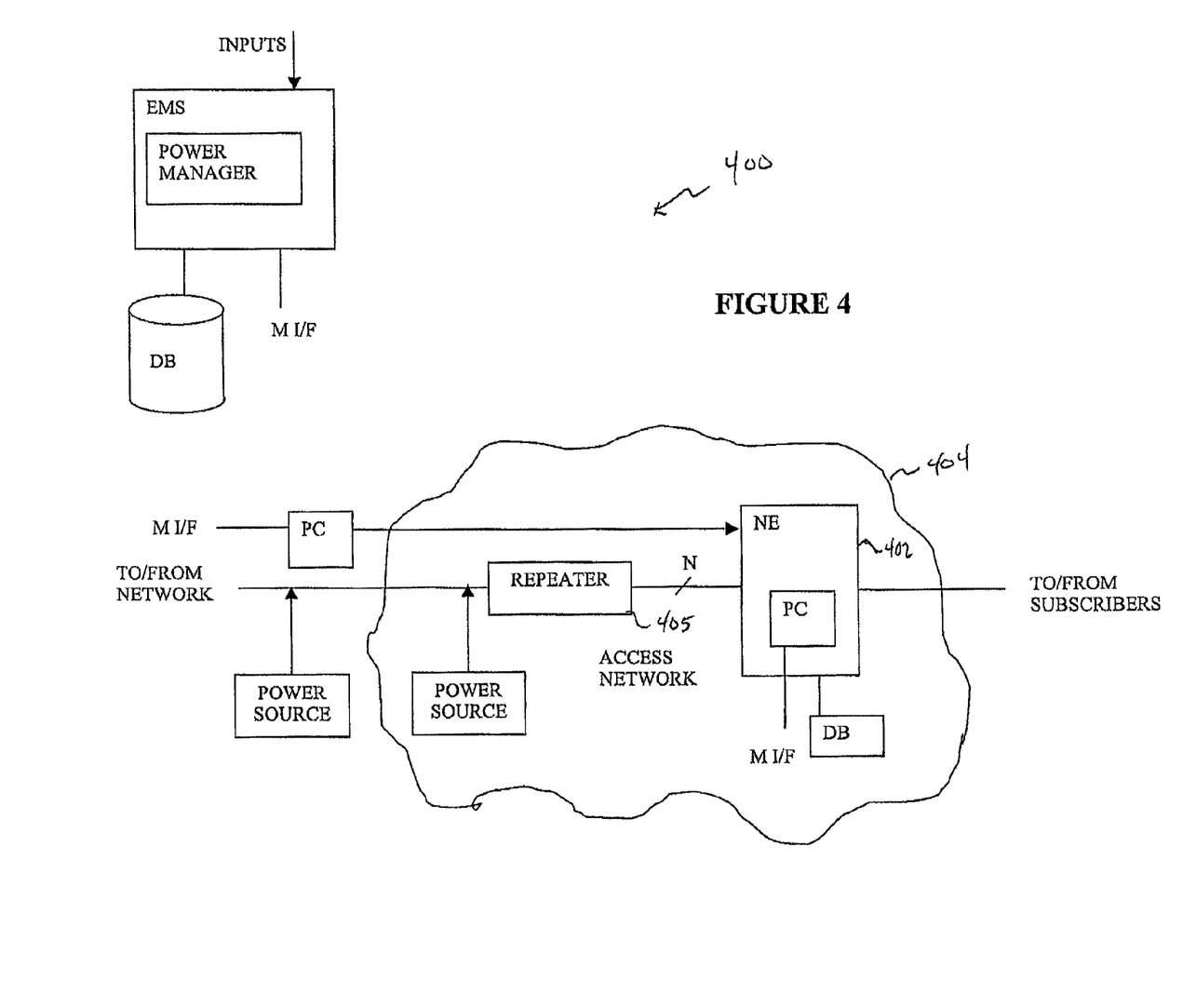
FIG. 4 is a block diagram of another embodiment of a system for managing power in a line powered network element through a repeater.

FIG. 4 is a block diagram of another embodiment of a system, indicated generally at 400, for managing power in a line powered network element 402 through a repeater 405 in access network 404. In this embodiment, the one or more repeater 405 passes power and communication signals to network element 402 in access network 404. Network element 402 is managed in a manner similar to that described above with respect to management of network element 202 of FIG. 2.

Figure 5:
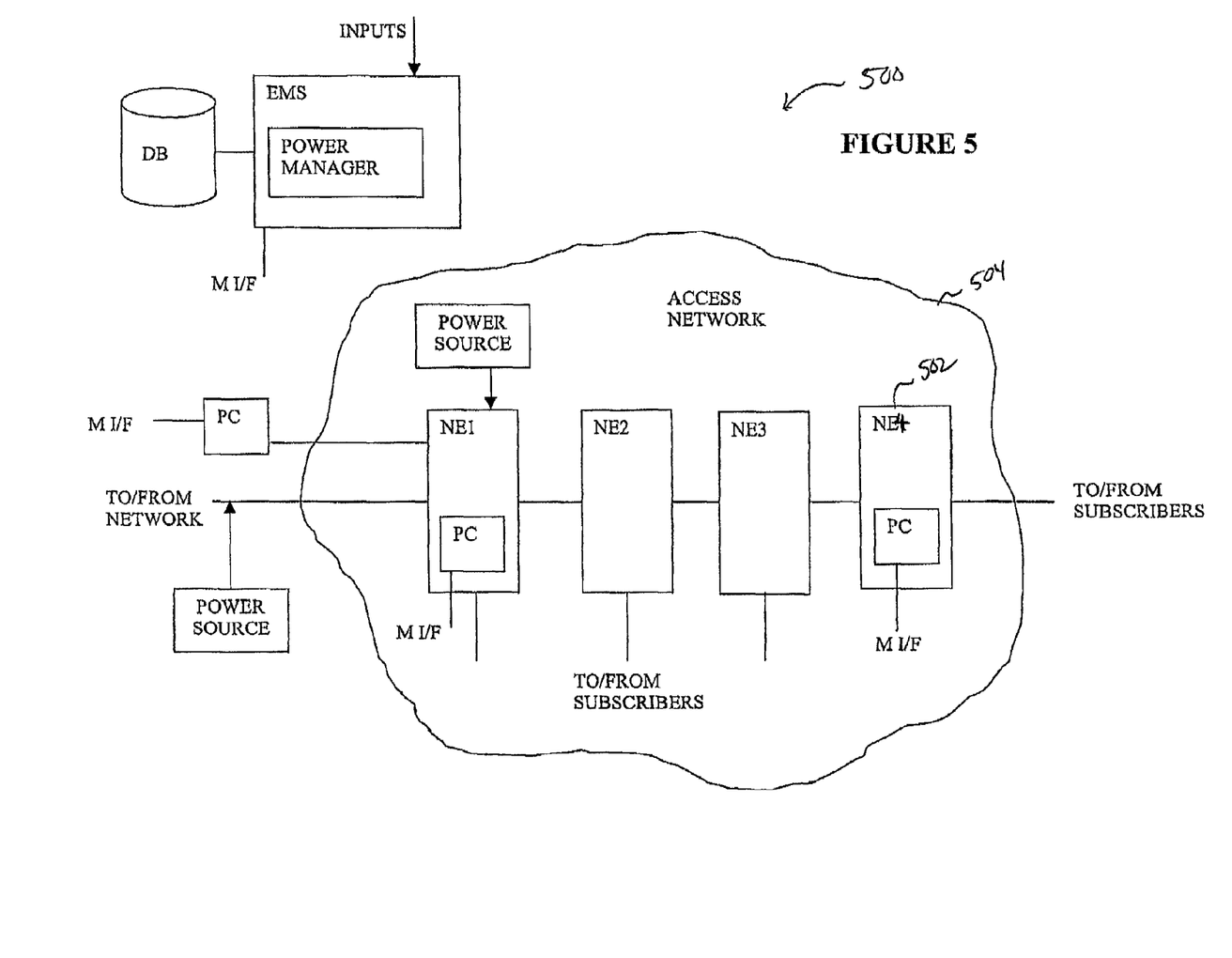
FIG. 5 is a block diagram of another embodiment of a system for managing power in a line powered network element in a linear network.

FIG. 5 is a block diagram of another embodiment of a system, indicated generally at 500, for managing power in a line powered network element 502 of linear network 504. Network element 502 is managed in a manner similar to network element 202 in FIG. 2. In one embodiment, network elements NE1, NE2 and NE3 are also line powered and are manageable in a manner similar to that of network element 502.

III. Global Power Management

Figure 6:
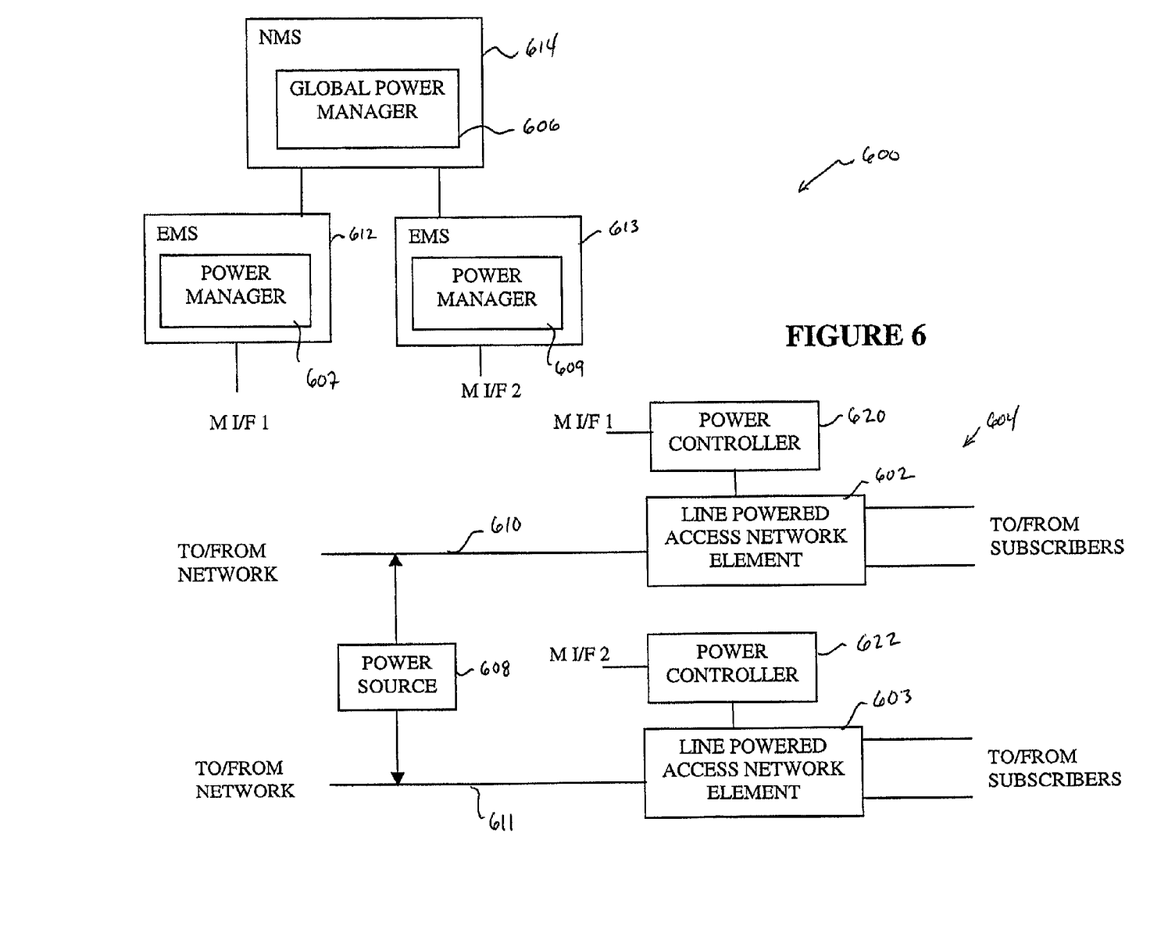
FIG. 6 is a block diagram of another embodiment of a system for managing power in a plurality of network elements in an access network.

FIG. 6 is a block diagram of another embodiment of a system, indicated generally at 600, for globally managing power in a plurality of network elements in an access network 604. Access network 604 includes a number of network elements represented by network elements 602 and 603. Network elements 602 and 603 communicate signals between subscribers and a network, e.g., the Internet, the PSTN. In one embodiment, access network 604 provides services such as digital subscriber line (DSL) service and plain old telephone service (POTS) to subscribers.

System 600 uses global power manager 606 to manage the operation of a number of line powered network elements represented by network elements 602 and 603. Advantageously, system 600 manages the operation of the network elements 602 and 603 to implement a global power management scheme even if the network elements are produced by different manufacturers and are managed by different element management systems. Further, this global power management allows centralized management of power consumption of a number of network elements in an access network that are fed from a common power source even when the access network includes a variety of element management systems.

FIG. 6 illustrates global power management for line powered network elements using an example with two line powered network elements that are each controlled by different element management systems. It is understood that in other embodiments any appropriate number of line powered network elements and any appropriate number of element management systems are used. Therefore, the embodiment with two element management systems and two line powered network elements is provided by way of example and not by way of limitation.

In the illustrated embodiment, global power manager 606 communicates with power managers 607 and 609 on element management systems (EMS) 612 and 613, respectively, over an appropriate management interface. Global power manager 606 comprises an instantiation of a global power management application running on a processor of network management system (NMS) 614. Global power manager 606 establishes power criteria for services running on network elements 602 and 603 based on a global view of the power requirements of the network. Further, global power manager 606 receives status, alarm and other data from network elements 602 and 603. These power criteria are established implicitly or explicitly as described above with respect to FIG. 2. In one embodiment, power profiles are used to allow provisioning of the power criteria as a part of the flow through provisioning of services on network elements 602 and 603.

Power managers 607 and 609 further manage the operation of network elements 602 and 603, respectively. Power managers 607 and 609 are instantiations of power management applications running on processors of element management systems (EMS) 612 and 613, respectively. In this example, power manager 607 communicates power criteria with power controller 620 to control network element 602. Further, power manager 609 communicates with power controller 622 to control network element 603.

Power source 608 is coupled to network elements 602 and 603 over a common power conductive medium, e.g., communication lines 610 and 611, respectively. In other embodiments, power supply 608 provides power to network elements 602 and 603 over a separate medium.

In operation, global power manager 606 manages operation of network elements 602 and 603 through power managers 607 and 609 and power controllers 620 and 622 based on provisioned power criteria. The power criteria are provided to power controllers 620 and 622 for services provisioned on network elements 602 and 603. These power criteria are provisioned either implicitly or explicitly. Once provisioned, power controllers 620 and 622 monitor their associated network elements 602 and 603. When power is lost or degraded, power controllers 620 and 622 manage the operation of network elements 602 and 603, respectively, according to the provisioned power criteria, e.g., shut off services according to provisioned priorities, enter low power mode or other appropriate actions based on available power levels.

What is claimed is:

1. A system for managing power from a power source for at least one line powered network element in an access network, the system comprising:
    a power manager that establishes at least one power criterion for the at least one network element;
    a power controller, responsive to the power manager;
    wherein the power controller and the power manager communicate to adjust operation of the at least one network element based on the at least one power criterion;
    wherein the power manager is configured to run a plurality of instantiations of a power management application, each instantiation associated with at least one network element; and
    wherein the power management application is instantiated based on provisioning an associated service on the network element.

2. The system of claim 1, wherein the power controller comprises one or more of a power controller that is embedded in the at least one network element, a power controller that runs on another network element in the access network, a power controller that resides outside the access network, and a distributed power controller with at least two modules with one module resident on the network element.

3. The system of claim 1, wherein the power manager comprises a power management module that runs on an element management system associated with the network element.

4. The system of claim 1, wherein the power manager comprises a power management module that runs on a network management system.

5. The system of claim 1, and further comprising a power source coupled to provide power to the network element.

6. The system of claim 5, wherein the power source comprises one of a power source associated with a network element within the access network, and a power source associated with a network element outside the access network.

7. The system of claim 5, wherein the power source injects power onto a communication medium coupled to the network element.

8. The system of claim 1, wherein each instantiation of the power management application comprises data tailored for the associated network element.

9. The system of claim 1, wherein the at least one network element comprises one of a network element in a ring network, a network element in a linear network, and a remote terminal associated with a central office terminal.

10. The system of claim 1, and further including a database associated with the power manager that includes a number of power profiles, each power profile containing at least one power criterion.

11. The system of claim 10, and further including a database associated with the power controller that stores the at least one power criterion for the network element.

12. An access network comprising:
    a power manager that manages power consumption in the access network;
    one or more power controllers, responsive to the power manager;
    one or more network elements, each network element configured to provide communication between subscriber equipment and a network;
    a communication medium coupled to the network element, the communication medium providing communication signals and providing power to the network element;
    wherein the power manager communicates with the power controller over a management interface to adjust operation of the network element based on at least one power criterion;
    wherein the power manager is configured to run a plurality of instantiations of a power management application, each instantiation associated with at least one of the one or more network elements; and
    wherein the power management application is instantiated based on provisioning an associated service on the network element.

13. The system of claim 12, wherein each power controller comprises one or more of a power controller that is embedded in the at least one network element, a power controller that runs on another network element in the access network, a power controller that resides outside the access network, and a distributed power controller with at least two modules with one module resident on the network element.

14. The system of claim 12, wherein the power manager comprises a power management module that runs on one of an element management system and a network management system.

15. The system of claim 12, and further comprising a power source coupled to provide power to the one or more network elements.

16. The system of claim 15, wherein the power source comprises one of a power source associated with a network element within the access network, and a power source associated with a network element outside the access network.

17. The system of claim 15, wherein the power source injects power onto a communication medium coupled to the one or more network elements.

18. The system of claim 12, wherein each instantiation of the power management application comprises data tailored for the associated network element.

19. The system of claim 12, wherein the one or more network elements comprises one of a network element in a ring network, a network element in a linear network, and a remote terminal associated with a central office terminal.

20. The system of claim 12, and further including a database associated with the power manager that includes a number of power profiles, each power profile containing at least one power criterion.

21. The system of claim 20, and further including a database associated with each power controller that stores the at least one power criterion for the network element.

22. A method for controlling a line-powered network element of an access network, the method comprising:
receiving at least one power criterion for controlling operation of a network element as part of flow through provisioning of a service on the network element;
monitoring at least one power condition at the network element; and
adjusting operation of the network element based on the at least one power criterion and the at least one power condition.

23. The method of claim 22, wherein receiving at least one power criterion comprises receiving at least one power criterion that establishes at least one of a shut down criteria for selected services or subscribers, service priority levels for selected subscribers, one or more trigger points for service adjustments, durations for allowed battery usage and indicia for implementation of terms of a service level agreement.

24. The method of claim 22, wherein adjusting operation comprises selectively shutting down service on ports when an available power level falls below a selected threshold.

25. The method of claim 22, wherein adjusting operation comprises turning off one or more of network side physical interfaces, customer side physical interfaces, fans, ringer supplies, analog front end (AFE) devices, and other digital devices.

26. The method of claim 22, wherein adjusting operation comprises reducing power consumption in one or more of network side physical interfaces, customer side physical interfaces, fans, ringer supplies, analog front end (AFE) devices, processors, CPUs, embedded functions and other digital devices.

27. The method of claim 22, wherein monitoring at least one power condition comprises monitoring power headroom.

28. The method of claim 24, wherein selectively shutting down ports comprises shutting down ports based on a selected priority scheme.

29. The method of claim 22, wherein the at least one power criterion is based on service level agreements for service provided at a plurality of ports of the network element.

30. The method of claim 22, wherein receiving the at least one power criterion comprises receiving one or more of service priority and allowable duration of battery usage.

31. The method of claim 22, wherein receiving at least one power criterion comprises inheriting the power criterion from a power profile associated with a selected service for a port of the network element.

32. The method of claim 22, wherein receiving at least one power criterion comprises receiving at least one power criterion from one of a power manager running on an element management system and a global power manager running on a network management system.

33. The method of claim 32, wherein the power manager inherits the at least one power criterion based on the selected service.

34. The method of claim 32, wherein the global power manager inherits the at least one power criterion based on a selected service.

35. The method of claim 22, wherein receiving at least one power criterion comprises receiving the at least one power control criteria when a service is provisioned.

36. The method of claim 22, and further comprising establishing at least one set of power criteria associated with a selectable service.

37. The method of claim 22, wherein monitoring at least one power condition comprises monitoring power supplied over one or more communication lines.

38. An access network comprising:
at least one network element;
a power conductive communication medium coupled to the at least one network element, the communication medium adapted to provide communication between subscriber equipment associated with the at least one network element and another network;
the communication medium further configured to provide power to the network element;
a power manager that establishes at least one power criterion for the at least one network element;
a power controller, responsive to the power manager;
wherein the power manager communicates with the power controller over a management interface to adjust operation of the network element based on the at least one power criterion
wherein the power manager is configured to run a plurality of instantiations of a power management application, each instantiation associated with at least one network element; and
wherein the power management application is instantiated based on provisioning an associated service on the at least one network element.

39. An access network comprising:
at least one network element;
a power conductive communication medium coupled to the at least one network element, the communication medium adapted to provide communication between subscriber equipment associated with the at least one network element and another network;
a power source configured to launch power onto the communication medium to provide power to the network element;
a power manager that establishes at least one power criterion for the at least one network element;
a power controller, responsive to the power manager;
wherein the power manager communicates with the power controller over a management interface to adjust operation of the network element based on the at least one power criterion
wherein the power manager is configured to run a plurality of instantiations of a power management application, each instantiation associated with at least one network element; and
wherein the power management application is instantiated based on provisioning an associated service on the at least one network element.

40. An access network comprising:
at least one network element;
a copper-based communication medium coupled to the at least one network element, the communication medium adapted to provide communication between subscriber equipment associated with the at least one network element and another network;

a power source configured to launch power onto the communication medium to provide power to the network element;

an element management system configured to manage the at least one network element;

at least one power management application configured to run on the element management system, at least one instantiation of the at least one power management application establishing at least one power criterion for a service provisioned on the at least one network element;

a power controller, responsive to the at least one instantiation of the at least one power management application; and wherein the at least one instantiation of the power management application communicates with the power controller over a management interface to adjust operation of the network element based on the at least one power criterion; and wherein the at least one power management application is instantiated based on provisioning an associated service on the at least one network element.

41. An access network comprising:

a plurality of network elements;

a power conductive communication medium coupled to each of the plurality of network elements, the communication medium configured to provide communication between subscriber equipment associated with the network element and another network;

at least one power source configured to launch power onto the communication medium to provide power to the plurality of network elements;

a network management system, configured to manage the access network;

a global power management application configured to run on the network management system;

a plurality of element management systems, each responsive to the network management system and configured to manage at least a portion of the plurality of network elements;

at least one power management application, responsive to the global power management application, configured to run on one of the plurality of element management systems, at least one instantiation of the at least one power management application establishing at least one power criterion for a service provisioned on at least one of the plurality of network elements;

a power controller, responsive to the at least one instantiation of the at least one power management application;

wherein the at least one instantiation of the power management application communicates with the power controller over a management interface to adjust operation of the network element based on the at least one power criterion; and wherein the at least one power management application is instantiated based on provisioning an associated service on at least one of the plurality of network elements.

42. A method for provisioning a service in a telecommunications network, the method comprising:

initiating service activation defining a service for a selected port of a line powered network element in an access network;

associating at least one power criterion with the service activation;

providing the at least one power criterion to a power controller associated with the line powered network element for managing the operation of the line powered network element for the activated service based at least in part on the at least one power criterion; and instantiating a power management application based on the service initiated, the power management application configured to communicate with the power controller in managing operation of the line powered network element.

43. The method of claim 42, wherein associating the at least one power criterion comprises inheriting the at least one power criterion based on a selected service type for the service activation.

44. The method of claim 42, wherein associating the at least one power criterion comprises explicitly selecting the at least one power criterion with the service activation.

45. A computer readable medium having instructions stored thereon for causing a processor to perform a method for controlling a line-powered network element of an access network, the method comprising:

receiving at least one power criterion for controlling operation of a network element as part of flow through provisioning of a service on the network element;

monitoring at least one power condition at the network element; and adjusting operation of the network element based on the at least one power criterion and the at least one power condition.

46. A computer readable medium having instructions stored thereon for causing a processor to perform a method for provisioning a service in a telecommunications network, the method comprising:

initiating service activation defining a service for a selected port of a line powered network element in an access network;

associating at least one power criterion with the service activation;

providing the at least one power criterion to a power controller associated with the line powered network element for adjusting the operation of the line powered network element for the activated service based at least in part on the at least one power criterion; and instantiating a power management application based on the service initiated, the power management application configured to communicate with the power controller in managing operation of the line powered network element.

47. A system for managing power from a power source for at least one line powered network element in an access network, the system comprising:

a power manager that establishes at least one power criterion for the at least one network element;

a power controller, responsive to the power manager;

wherein the power controller and the power manager communicate to adjust operation of the communication functions of the at least one network element based on the at least one power criterion;

wherein the power manager is configured to run a plurality of instantiations of a power management application, each instantiation associated with at least one network element; and wherein the power management application is instantiated based on provisioning an associated service on the network element.

48. A system for managing power from a power source for at least one line powered network element in an access network, the system comprising:
- a power manager that establishes at least one power criterion for the at least one network element;
- a power controller, responsive to the power manager;
- wherein the power controller and the power manager communicate to adjust operation of circuitry that consumes power in the at least one network element based on the at least one power criterion;
- wherein the power manager is configured to run a plurality of instantiations of a power management application, each instantiation associated with at least one network element; and
- wherein the power management application is instantiated based on provisioning an associated service on the network element.

49. The system of claim 48, wherein managing the operation of circuitry that consumes power comprises at least one of placing circuitry in low power mode, shutting down ports based on a predetermined scheme, reducing power consumption in one or more of network side physical interfaces, customer side physical interfaces, fans, ringer supplies, analog front end (AFE) devices, processors, CPUs, embedded functions and other digital devices, and turning off one or more of network side physical interfaces, customer side physical interfaces, fans, ringer supplies, AFE devices, and other digital devices.

50. A system for managing power from a power source for at least one line powered network element in an access network, the system comprising:
- a power manager that establishes at least one power criterion for the at least one network element;
- a power controller, responsive to the power manager;
- wherein the power controller and the power manager communicate to adjust operation of the at least one network element including priority-based shut down of services based on the at least one power criterion;
- wherein the power manager is configured to run a plurality of instantiations of a power management application, each instantiation associated with at least one network element; and
- wherein the power management application is instantiated based on provisioning an associated service on the network element.

51. A system for managing power from a power source for at least one line powered network element in an access network, the system comprising:
- a power manager that establishes at least one power criterion for the at least one network element;
- a power controller, responsive to the power manager;
- wherein the power controller and the power manager communicate to shut down services at the at least one network element based on a predetermined scheme and based on the at least one power criterion;
- wherein the power manager is configured to run a plurality of instantiations of a power management application, each instantiation associated with at least one network element; and
- wherein the power management application is instantiated based on provisioning an associated service on the network element.

52. The system of claim 51, wherein the predetermined scheme includes a priority scheme based on at least one of service type, port number, service level agreements, and random selection.

53. A system for managing power from a power source for at least one line powered network element in an access network, the system comprising:
- a power manager that establishes at least one power criterion for the at least one network element, wherein the power manager is located remote from the at least one network element;
- a power controller, responsive to the power manager;
- wherein the power controller and the power manager communicate to adjust operation of the at least one network element based on the at least one power criterion;
- wherein the power manager is configured to run a plurality of instantiations of a power management application, each instantiation associated with at least one network element; and
- wherein the power management application is instantiated based on provisioning an associated service on the network element.

54. A system for managing power from a power source for at least one line powered network element in an access network, the system comprising:
- a power manager;
- a power controller, responsive to the power manager;
- wherein the power manager provisions the power controller with at least one power criterion for the at least one network element;
- wherein the power controller and the power manager communicate to adjust operation of the at least one network element based on the at least one power criterion;
- wherein the power manager is configured to run a plurality of instantiations of a power management application, each instantiation associated with at least one network element; and
- wherein the power management application is instantiated based on provisioning an associated service on the network element.

55. An access network comprising:
- a power manager that manages power consumption in the access network;
- one or more power controllers, responsive to the power manager;
- one or more network elements, each network element adapted to provide communication between subscriber equipment and a network;
- a communication medium coupled to the network element, the communication medium providing communication signals and providing power to the network element;
- wherein the power manager communicates with the power controller over a management interface to adjust operation of circuitry that consumes power in the network element based on at least one power criterion;
- wherein the power manager is configured to run a plurality of instantiations of a power management application, each instantiation associated with at least one of the one or more network elements; and
- wherein the power management application is instantiated based on provisioning an associated service on one of the one or more network elements.

56. The network of claim 55, wherein managing the operation of circuitry that consumes power comprises at least one of placing circuitry in low power mode, shutting down ports based on a predetermined scheme, reducing power consumption in one or more of network side physical interfaces, customer side physical interfaces, fans, ringer supplies, analog front end (AFE) devices, processors, CPUs, embedded functions and other digital devices, and turning off one or more of network side physical interfaces, customer side physical interfaces, fans, ringer supplies, analog front end (AFE) devices, and other digital devices.

57. A method for controlling a line-powered network element of an access network, the method comprising:
- receiving at least one power criterion for controlling operation of a network element as part of flow through provisioning of a service on the network element;
- monitoring at least one power condition at the network element; and
- adjusting operation of the circuitry that consumes power in the network element based on the at least one power criterion and the at least one power condition.

58. The method of claim 57, wherein adjusting the operation of the circuitry that consumes power in the network element comprises at least one of placing circuitry in low power mode, shutting down ports based on a predetermined scheme, reducing power consumption in one or more of network side physical interfaces, customer side physical interfaces, fans, ringer supplies, analog front end (AFE) devices, processors, CPUs, embedded functions and other digital devices, and turning off one or more of network side physical interfaces, customer side physical interfaces, fans, ringer supplies, analog front end (AFE) devices, and other digital devices.

* * * * *